United States Patent
Hirashima et al.

(10) Patent No.: US 8,155,438 B2
(45) Date of Patent: *Apr. 10, 2012

(54) APPARATUS AND METHOD FOR ADJUSTING INPUTTED COLOR CONCERNING TOTAL AND SPECIFIC COLORS

(75) Inventors: Tsuyoshi Hirashima, Kasuya-Gun (JP); Jun Ikeda, Fukuoka (JP); Shuichi Ojima, Fukuoka (JP); Ryouta Hata, Iizuka (JP); Shinya Kiuchi, Iizuka (JP)

(73) Assignee: Panasonic Corporation, Osaka (JP)

( * ) Notice: Subject to any disclaimer, the term of this patent is extended or adjusted under 35 U.S.C. 154(b) by 996 days.

This patent is subject to a terminal disclaimer.

(21) Appl. No.: 12/119,079

(22) Filed: May 12, 2008

(65) Prior Publication Data

US 2008/0218636 A1 Sep. 11, 2008

Related U.S. Application Data

(63) Continuation of application No. 10/840,234, filed on May 7, 2004, now Pat. No. 7,403,653.

(30) Foreign Application Priority Data

May 29, 2003 (JP) ................................. 2003-151928

(51) Int. Cl.
*G06K 15/00* (2006.01)

(52) U.S. Cl. ........................ 382/167; 348/649; 358/518
(58) Field of Classification Search .................. 382/167; 348/649; 358/518
See application file for complete search history.

(56) References Cited

U.S. PATENT DOCUMENTS

| 5,212,546 A * | 5/1993 | Arazi et al. ................... 358/518 |
| 5,384,601 A | 1/1995 | Yamashita et al. |
| 5,552,904 A | 9/1996 | Ryoo et al. |
| 6,058,208 A * | 5/2000 | Ikeda et al. ................... 382/167 |
| 6,229,580 B1 | 5/2001 | Inoue |
| 6,739,767 B2 * | 5/2004 | Ikeda et al. ................... 396/567 |
| 6,831,755 B1 * | 12/2004 | Narushima et al. ............ 358/1.9 |
| 7,016,075 B1 | 3/2006 | Tsukada |
| 7,280,259 B2 * | 10/2007 | Sanger ......................... 358/504 |

FOREIGN PATENT DOCUMENTS

| JP | 3-88577 | 4/1991 |
| JP | 05-300531 | 11/1993 |
| JP | 06-078320 | 3/1994 |
| JP | 10-198795 | 7/1998 |
| JP | 2001-169135 | 6/2001 |
| JP | 2002-33934 | 1/2002 |

OTHER PUBLICATIONS

European Search Report issued Dec. 3, 2004 in European Application No. EP 04 01 0258.

* cited by examiner

*Primary Examiner* — Matthew Bella
*Assistant Examiner* — Eueng-Nan Yeh
(74) *Attorney, Agent, or Firm* — Wenderoth, Lind & Ponack, L.L.P.

(57) ABSTRACT

A specific color-adjusting stage adjusts data of an inputted color with respect to a specific color. A total color-adjusting stage adjusts the data of the inputted color with respect to a total color. The specific color-adjusting stage and the total color-adjusting stage are provided in parallel. A composing unit composes linearly an output of the specific color-adjusting stage and an output of the total color-adjusting stage. When a degree that the total color-adjusting stage adjusts the data of the inputted color increases, then a degree that the specific color-adjusting stage adjusts the data of the inputted color decreases, and vice versa.

2 Claims, 9 Drawing Sheets

Fig. 4(a) skin color
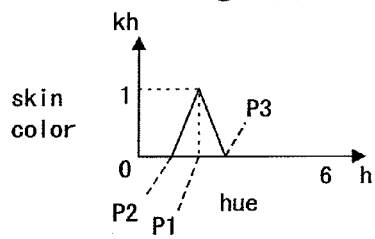
Fig. 4(b)
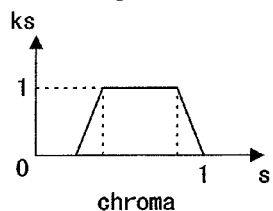
Fig. 4(c)
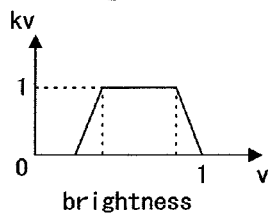
Fig. 4(d) sky blue
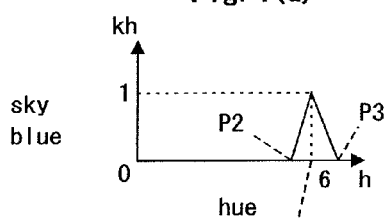
Fig. 4(e)
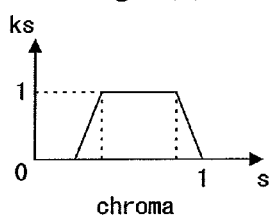
Fig. 4(f)
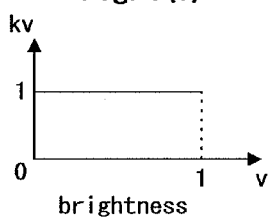
Fig. 4(g) grass green
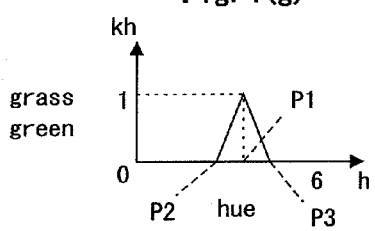
Fig. 4(h)
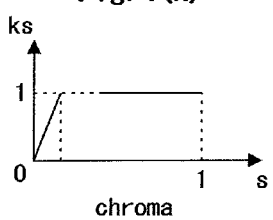
Fig. 4(i)
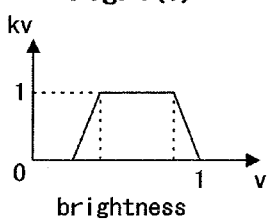

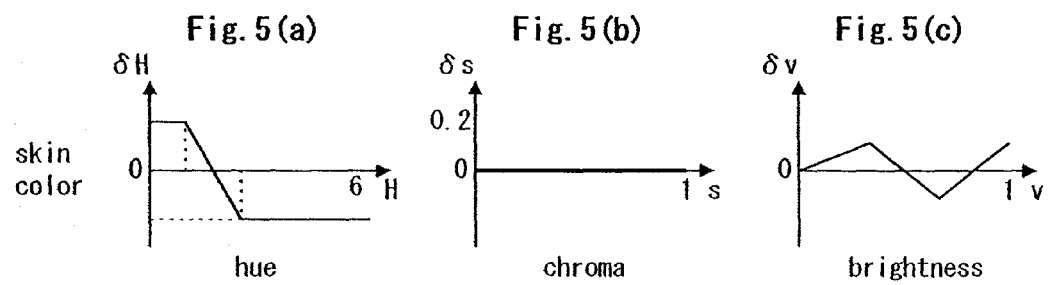
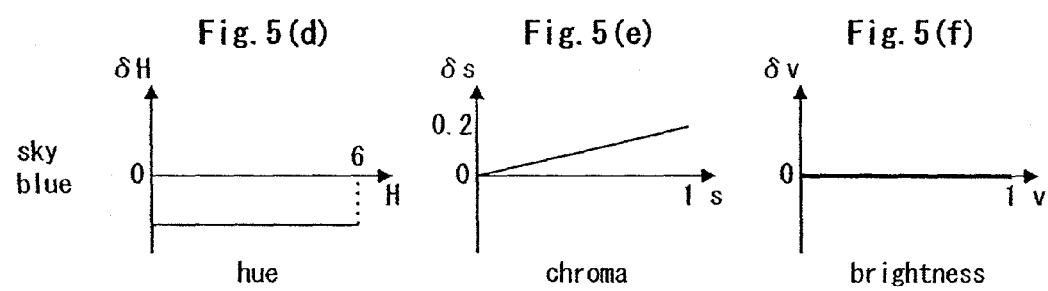
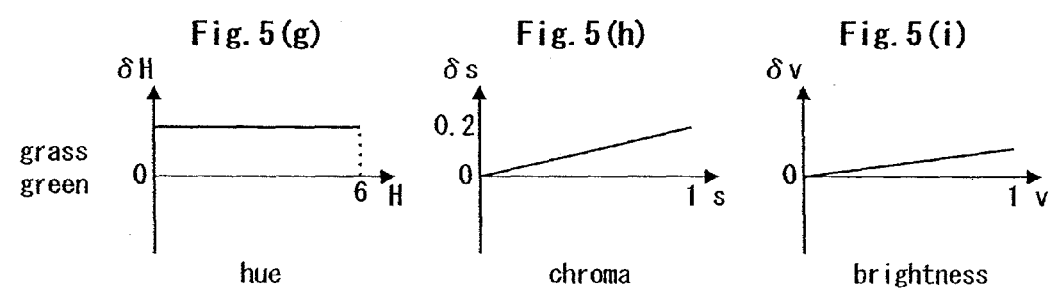
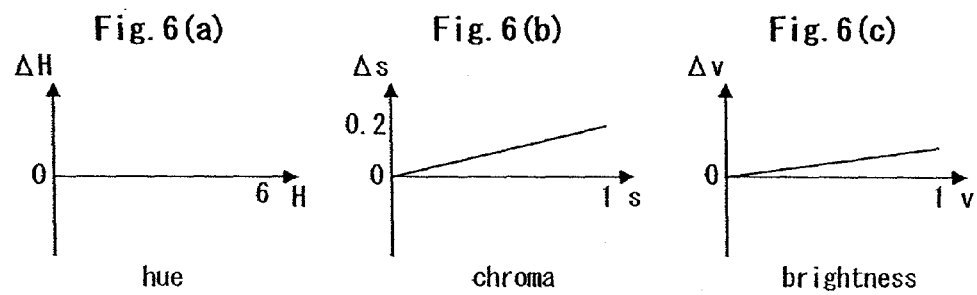

APPARATUS AND METHOD FOR ADJUSTING INPUTTED COLOR CONCERNING TOTAL AND SPECIFIC COLORS

This is a 53(b) Continuation application of Ser. No. 10/840,234, filed May 7, 2004 now U.S. Pat. No. 7,403,653.

BACKGROUND OF THE INVENTION

1. Field of the Invention

The present invention relates to a color-adjusting apparatus that adjusts color data for a color reproduction device, such as a TV apparatus, a mobile terminal, a computer display, and a color printer, and arts related thereto. More particularly, the present invention relates to a technique that adjusts a specific color and a total color of an inputted image.

In this specification, all kinds of physical quantity indicating how a color is bright, such as lightness, value, luminance, and so on, is generically called "brightness". Similarly, all kinds of physical quantity indicating how a color looks vivid, such as chromaticity, saturation, and so on, is generically called "chroma". Note that a color is a three-dimensional vector in a color space, basically.

2. Description of the Related Art

For example, a user of the TV apparatus can adjust a chroma phase and a chroma level of analog video signals reproduced thereby, utilizing a conventional color-adjusting apparatus mounted therein. Furthermore, the user can adjust a total color of the TV apparatus to his/her favorite color, changing a level of brightness of the analog video signals.

Adjusting the total color is effective, when difference of conditions, such as lighting environment, color characteristics of a camera and/or a display device, should be absorbed to perform transparent reproduction, and when chroma should be increased to reproduce colors more vividly. Once the total color has been adjusted suitably, the user may be almost satisfied with a result of the color reproduction. In this specification, a "total" color is a color that is an object of the total color adjustment.

Meanwhile, it is known that a "memory color", such as skin color, sky blue, grass green, and so on, which is well retained in human memory, differs from a color of the real thing corresponding thereto. In the so-called "preferred color reproduction" (for example, in reproduction of the "memory color"), it is insufficient to perform the total color adjustment merely. Furthermore, it is necessary to be able to adjust a current color to the "memory color", individually. In this specification, a "specific" color is a color that is an object of the specific color adjustment.

A document 1 (published Japanese Patent Application Laid-Open No. H05-300531) discloses a color-adjusting method that adjusts a specific color region individually, by designating the specific color.

A document 2 (published Japanese Patent Application Laid-Open No. H06-78320) discloses a color-adjusting apparatus. The color-adjusting apparatus sets a weighting coefficient, according to difference between an inputted chroma value and a pre-selected reference chroma value. The color-adjusting apparatus then adjusts a particular subject of a color in a chroma plane, whose coordinates are hue components and chroma components, based on the weighting coefficient.

Furthermore, a document 3 (published Japanese Patent Application Laid-Open No. H10-198795) discloses a color-adjusting apparatus. The color-adjusting apparatus of the document 3 calculates a color approximation degree hx that indicates an approximation degree of the current hue to a designated hue.

The color-adjusting apparatus of the document 3 adjust a color of (R, G, B) to output a color of (R', G', B'), according to the following formula.

$$(R',G',B')=(R,G,B)+hx*(a1,a2,a3),$$

where a1, a2, and a3 are vector-adjusting coefficients for R, G and B, respectively.

Referring to the documents 1, 2 and 3, a color-adjusting apparatus that adjusts both of the specific color and the total color may be constructed as shown in FIG. 13.

In FIG. 13, a total color-adjusting unit 1 performs the total color adjustment of data of an inputted color, and outputs a result vector of the total color adjustment to a composing unit 6 and a specific color-weighting coefficient-calculating unit 3. Thanks to the total color adjustment, the difference of conditions, such as lighting environment, color characteristics of a camera and/or a display device, has been absorbed.

A specific color-adjusting stage 2, which is provided next to the total color-adjusting unit 1, comprises the following elements. The specific color-weighting coefficient-calculating unit 3 calculates a weighting coefficient k with respect to a specific color, such as skin color, and so on.

A specific color-adjusting vector-outputting unit 4 outputs, to a multiplying unit 5, data of an adjusting vector δ with respect to the specific color. The multiplying unit 5 multiplies the adjusting vector δ by a scalar of the weighting coefficient k to output data of a weighted vector to the composing unit 6.

The composing unit 6 inputs the data of the result vector of the total color adjustment from the total color-adjusting unit 1, and inputs the data of the weighted vector from the multiplying unit 5.

The composing unit 6 adds the result vector and the weighted vector, and outputs data of an added vector. In short, first, the total color adjustment is made; secondly, the specific color adjustment is made. That is, with respect to the specific color, adjustments are duplicated.

It is assumed that the data of the inputted color has chroma components, each of which has 8-bit data length (256 scales in total). Furthermore, it is assumed that the chroma components should be multiplied by a factor of "1.2", generally, and further that a chroma component of the specific color should not be changed.

In this case, the total color-adjusting unit 1 multiplies the chroma components of the inputted color by the factor of "1.2", and outputs data of a result vector. The specific color-adjusting vector-outputting unit 4 and/or the multiplying unit 5 multiplies, by a factor of "1/1.2", the chroma component of the specific color, the chroma component being included in the data of the result vector. That is, with respect to the specific color, duplication of adjustments cannot be avoided.

In digital image processing, since each of coordinates of the inputted color is quantized, quantization errors may occur in some cases. For example, choose an original value of "99", multiplied by a factor of "1.2", and multiplied by a factor of "1/1.2"; the result is "98", which does not equal the original value. Also, after the duplicated adjustment, in many cases, a quantization error may occur, thereby the chroma component of the specific color may be changed, contrary to expectations.

Furthermore, in the digital image processing, a clip of a value may occur in some cases. When data has 8-bit length, a value of the data cannot be 256 or more. For example, choose an original value of "250", multiplied by a factor of "1.2"; the result is not "300" but 255", because a clip of the value has occurred. In addition, the result of "255" multiplied by a factor of "1/1.2" is "212", which does not equal the original value.

In a case where the color-adjusting apparatus should adjust both of the specific color and the total color, since the adjustments must be duplicated according to the prior arts, quality of an inputted image is deteriorated very easily, caused by the quantization error and/or the clip of a value, and so on.

Meanwhile, it is assumed that brightness and/or chroma with respect to the specific color should not be changed, and further that hue of the specific color should be changed to more preferable one. In this case, since the total color-adjusting unit 1 has adjusted the total color before adjustment of the specific color, whole conversion loses linearity, and handling thereof is very difficult.

OBJECTS AND SUMMARY OF THE INVENTION

In view of the above, an object of the present invention is to provide a color-adjusting apparatus that can reduce deterioration of image quality caused by the quantization error and/or the clip, and further that can be handled easily.

A first aspect of the present invention provides a color-adjusting apparatus comprising: a total color-adjusting stage operable to perform a total color adjustment for data of an inputted color with respect to a total color to output data of a result vector of the total color adjustment; a specific color-adjusting stage operable to perform a specific color adjustment for the data of the inputted color with respect to a specific color to output data of a result vector of the specific color adjustment; and a composing unit operable to linearly compose the data of the result vector of the total color adjustment output by the total color-adjusting stage and the data of the result vector of the specific color adjustment output by the specific color-adjusting stage; wherein the total color-adjusting stage and the specific color-adjusting stage are provided to operate in a parallel manner; wherein, when a degree that the total color-adjusting stage adjusts the data of the inputted color increases, then a degree that the specific color-adjusting stage adjusts the data of the inputted color decreases; and wherein, when a degree that the total color-adjusting stage adjusts the data of the inputted color decreases, then a degree that the specific color-adjusting stage adjusts the data of the inputted color increases.

With this structure, the total color-adjusting stage performs the total color adjustment and the specific color-adjusting stage performs the specific color adjustment, in parallel. The composing unit linearly composes the data of the result vector of the total color adjustment and the data of the result vector of the specific color adjustment. When a degree increases in that the total color-adjusting stage adjusts the data of the inputted color, then a degree decreases in that the specific color-adjusting stage adjusts the data of the inputted color, and vice versa. Accordingly, with respect to the specific color, the total color adjustment and the specific color adjustment are not duplicated, and deterioration of image quality caused by quantization errors, clips, and so on, occurs hardly. Consequently, quality of an adjusted image can be retained fine.

Since the degrees of adjustments have the above-mentioned relationship, the total color adjustment and the specific color adjustment do not interfere with each other. According to the color-adjusting apparatus, although both of the total color adjustment and the specific color adjustment are carried out, almost the same result can be obtained as that of a case where the data of the inputted color is adjusted exclusively with respect to the specific color. In other words, it is easy to perform the "preferred color reproduction".

Since it is considerable that the total color-adjusting stage and the specific color-adjusting stage are provided separately from each other, a user of the color-adjusting apparatus may think that the data of the result vector of the total color adjustment and the data of the result vector of the specific color adjustment are independent from each other. The overall conversion of the color-adjustment apparatus is neither not non-liner nor complicated, because the composing unit linearly composes the data of the result vector of the total color adjustment and the data of the result vector of the specific color adjustment. Therefore, the user can carry out necessary color adjustment, easily.

A second aspect of the present invention provides a color-adjusting apparatus as defined in the first aspect of the present invention, wherein the total color-adjusting stage comprises: a total color-weighting coefficient-calculating unit operable to calculate a total color-weighting coefficient indicating an approximation degree of the inputted color and the total color; a total color-adjusting vector-outputting unit operable to output data of a total color-adjusting vector with respect to the total color; and a total color-multiplying unit operable to multiply the total color-adjusting vector by the total color-weighting coefficient to output the data of the result vector of the total color adjustment; wherein the specific color-adjusting stage comprises: a specific color-weighting coefficient-calculating unit operable to calculate a specific color-weighting coefficient indicating an approximation degree of the inputted color and the specific color; a specific color-adjusting vector-outputting unit operable to output data of a specific color-adjusting vector with respect to the specific color; and a specific color-multiplying unit operable to multiply the specific color-adjusting vector by the specific color-weighting coefficient to output the data of the result vector of the specific color adjustment; wherein, when the total color-weighting coefficient increases, then the specific color-weighting coefficient decreases; wherein, when the total color-weighting coefficient decreases, then the specific color-weighting coefficient increases; and wherein the composing unit is operable to add the inputted color, the result vector of the total color adjustment, and the result vector of the specific color adjustment to output data of an adjusted color.

With this structure, sum-of-products calculation, using the total color-weighting coefficient, the total color-adjusting vector, the specific color-weighting coefficient, and the specific color-adjusting vector, is performed. According to the sum-of-products calculation, the total color adjustment and the specific color adjustment are carried out in parallel. Preventing the quantization errors, clips, and so on, quality of the adjusted image can be kept fine. Furthermore, the specific color adjustment for the "preferred color reproduction" and the total color adjustment for the transparent reproduction can be made altogether.

In addition, the adjusted color is not a color that is converted directly from the inputted color, but the sum of the inputted color, the result vector of the total color adjustment, and the result vector of the specific color adjustment. Accordingly, an adjusted image composed of a plurality of adjusted colors can retain gradation of an inputted image composed of a plurality of inputted colors.

A third aspect of the present invention provides a color-adjusting apparatus as defined in the first aspect of the present invention, wherein, when the inputted color equals the specific color, the specific color-weighting coefficient equals a maximum value; wherein, when a distance in color space between the inputted color and the specific color increases, the specific color-weighting coefficient decreases; and wherein, when the inputted color is not equivalent to the specific color, the total color-weighting coefficient is equivalent to the maximum value minus the specific color-weighting coefficient.

With this structure, when the inputted color equals the specific color, the specific color-weighting coefficient equals the maximum value. When the distance between the inputted color and the specific color increases, the specific color-weighting coefficient decreases. When the inputted color does not equal the specific color, the total color-weighting coefficient equals the maximum value minus the specific color-weighting coefficient. Therefore, the result vector of the total color adjustment and the result vector of the specific color adjustment change, gradually and cooperatively.

In general, in the inputted image, when there is a first portion whose color is the specific color, and a second portion whose color is not the specific color, pseudo-outlines often appear along a border between the first portion and the second portion. However, with this structure, since the result vector of the total color adjustment and the result vector of the specific color adjustment change smoothly, the occurrence of the pseudo-outlines can be lessened.

A fourth aspect of the present invention provides a color-adjusting apparatus as defined in the first aspect of the present invention, wherein the specific color-weighting coefficient is determined based on a weighting coefficient kv evaluated on a brightness axis, a weighting coefficient kc evaluated on a chroma axis, and a weighting coefficient kh evaluated on a hue axis.

With this structure, reflecting the weighting coefficients kv, kc and kh, the specific color adjustment can be carried out.

A fifth aspect of the present invention provides a color-adjusting apparatus as defined in the first aspect of the present invention, wherein the data of the specific color-adjusting vector is determined based on the data of the inputted color.

A sixth aspect of the present invention provides a color-adjusting apparatus as defined in the first aspect of the present invention, wherein the data of the total color-adjusting vector is determined based on the data of the inputted color.

With these structures, according to the inputted color, the specific color-adjusting vector and the total color-adjusting vector can be set.

A seventh aspect of the present invention provides a color-adjusting apparatus as defined in the second aspect of the present invention, the color-adjusting apparatus further comprising: a color area-judging unit operable to store individual area information of a color space divided into a plurality of areas; wherein the color area-judging unit is operable to determine an area to which the inputted color belongs, the area being one of the plurality of areas, and outputs area information corresponding to the inputted color; wherein the specific color-weighting coefficient-calculating unit is operable to calculate, using the area information corresponding to the inputted color, the specific color-weighting coefficients indicating the approximation degree of the inputted color and the specific color; and wherein the specific color-adjusting vector-outputting unit is operable to output, using the area information corresponding to the inputted color, the data of the specific color-adjusting vector with respect to the specific color.

An eighth aspect of the present invention provides a color-adjusting apparatus as defined in the seventh aspect of the present invention, wherein the specific color-adjusting stage further comprises: a specific color-weighting coefficient-selecting unit operable to store a plurality of specific color-weighting coefficients, and operable to outputs a specific color-weighting coefficient among the plurality of specific color-weighting coefficients corresponding to the area information; and a specific color-adjusting vector coefficient-selecting unit operable to store a plurality of specific color-adjusting vector coefficients, and operable to output a specific color-adjusting vector coefficient among the plurality of specific color-adjustment vector coefficients corresponding to the area information; wherein the specific color-weighting coefficient-calculating unit is operable to calculate, using the specific color-weighting coefficient corresponding to the area information, the specific color-weighting coefficients indicating the approximation degree of the inputted color and the specific color; and wherein the specific color-adjusting vector-outputting unit is operable to output, using the specific color-adjusting vector coefficient corresponding to the area information, the data of the specific color-adjusting vector with respect to the specific color.

With these structures, the color area-judging unit is provided. The area information is used for dividing the color space of the inputted color into the plurality of areas. Using the area information, the specific color-weighting coefficient and the specific color-adjusting vector change according to an area to which the inputted color belongs. Therefore, specific color adjustment with respect to a plurality of specific colors can be made. Furthermore, the total color adjustment and the specific color adjustment are not duplicated, and deterioration of image quality caused by quantization errors, and so on, can be reduced.

In addition, even when color adjustments with respect to a plurality of specific colors should be made, it is sufficient to provide one set of the specific color-weighting coefficient-calculating unit and the specific color-adjusting vector-outputting unit. That is, a necessary circuit scale can be reduced in comparison with a case where a number of sets of the specific color-weighting coefficient-calculating unit and the specific color-adjusting vector-outputting unit are provided. Herein, the number is equal to a number of the plurality of specific colors.

A ninth aspect of the present invention provides a color-adjusting apparatus as defined in the seventh aspect of the present invention, wherein the specific color-weighting coefficient-calculating unit is operable to use the area information as an offset of a domain that defines one of the plurality of areas to which the inputted color belongs.

A tenth aspect of the present invention provides a color-adjusting apparatus as defined in the second aspect of the present invention, wherein the color-adjusting apparatus further comprising: a color space-converting unit operable to map the data of the inputted color in an original color space into data of the inputted color in another color space defined by a brightness coordinate, a chroma coordinate, and a hue coordinate, and further operable to output data of the inputted color mapped to the other color space to the specific color-weighting coefficient-calculating unit.

An eleventh aspect of the present invention provides a color-adjusting apparatus as defined in the second aspect of the present invention, the color-adjusting apparatus further comprising: a color space-inverse converting unit operable to map the data of the adjusted color in a color space defined by a brightness coordinate, a chroma coordinate, and a hue coordinate into data of the adjusted color in an original color space of the inputted color.

With these structures, a user of these color-adjusting apparatuses can set the specific color-weighting coefficient, intuitively and easily. Since quantization errors and/or clips caused by color space conversion and color space inverse conversion are lessened, deterioration of color quality can be reduced.

A twentieth aspect of the present invention provides a color-adjusting apparatus as defined in the tenth aspect of the present invention, wherein the color space defined by the brightness coordinate, the chroma coordinate, and the hue coordinate is an HSV color space.

In many cases, the inputted color is expressed in the RGB color space. Each of the RGB color space and the HSV color space has the same capacity. Accordingly, any clip may not be caused by mapping the adjusted color in the HSV color space into the adjusted color in the RGB color space, which is an original color space of the inputted color, does not cause.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 (b) is a graph, explaining a weighting coefficient kc (chroma) in the embodiment 1 of the present invention;

FIG. 2 (c) is a graph, explaining a weighting coefficient ky (brightness) in the embodiment 1 of the present invention;

FIG. 4 (a) is a graph, explaining a weighting coefficient kh (hue, skin color) in the embodiment 2 of the present invention;

FIG. 4 (b) is a graph, explaining a weighting coefficient ks (chroma, skin color) in the embodiment 2 of the present invention;

FIG. 4 (c) is a graph, explaining a weighting coefficient kv (brightness, skin color) in the embodiment 2 of the present invention;

FIG. 4 (d) is a graph, explaining a weighting coefficient kh (hue, sky blue) in the embodiment 2 of the present invention;

FIG. 4 (e) is a graph, explaining a weighting coefficient ks (chroma, sky blue) in the embodiment 2 of the present invention;

FIG. 4 (f) is a graph, explaining a weighting coefficient kv (brightness, sky blue) in the embodiment 2 of the present invention;

FIG. 4 (g) is a graph, explaining a weighting coefficient kh (hue, grass green) in the embodiment 2 of the present invention;

FIG. 4 (h) is a graph, explaining a weighting coefficient ks (chroma, grass green) in the embodiment 2 of the present invention;

FIG. 4 (i) is a graph, explaining a weighting coefficient kv (brightness, grass green) in the embodiment 2 of the present invention;

FIG. 5 (a) is a graph, explaining hue $\delta H$ of an adjusting vector $\delta$ (skin color) in the embodiment 2 of the present invention;

FIG. 5 (b) is a graph, explaining chroma $\delta s$ of the adjusting vector $\delta$ (skin color) in the embodiment 2 of the present invention;

FIG. 5 (c) is a graph, explaining brightness $\delta v$ of the adjusting vector $\delta$ (skin color) in the embodiment 2 of the present invention;

FIG. 5 (d) is a graph, explaining hue $\delta H$ of an adjusting vector $\delta$ (sky blue) in the embodiment 2 of the present invention;

FIG. 5 (e) is a graph, explaining chroma $\delta s$ of the adjusting vector $\delta$ (sky blue) in the embodiment 2 of the present invention;

FIG. 5 (f) is a graph, explaining brightness $\delta v$ of the adjusting vector $\delta$ (sky blue) in the embodiment 2 of the present invention;

FIG. 5 (g) is a graph, explaining hue $\delta H$ of an adjusting vector $\delta$ (grass green) in the embodiment 2 of the present invention;

FIG. 5 (h) is a graph, explaining chroma $\delta s$ of the adjusting vector $\delta$ (grass green) in the embodiment 2 of the present invention;

FIG. 5 (i) is a graph, explaining brightness $\delta v$ of the adjusting vector $\delta$ (grass green) in the embodiment 2 of the present invention;

FIG. 6 (a) is a graph, explaining hue of a total color-adjusting vector $\Delta$ in the embodiment 2 of the present invention;

FIG. 6 (b) is a graph, explaining chroma of the total color-adjusting vector $\Delta$ in the embodiment 2 of the present invention;

FIG. 6 (c) is a graph, explaining brightness of the total color-adjusting vector $\Delta$ in the embodiment 2 of the present invention;

FIG. 10 (b) is a descriptive illustration, showing a second area in the embodiment 3 of the present invention;

FIG. 10 (c) is a descriptive illustration, showing a third area in the embodiment 3 of the present invention;

DETAILED DESCRIPTION OF THE PREFERRED EMBODIMENTS

Figure 1:
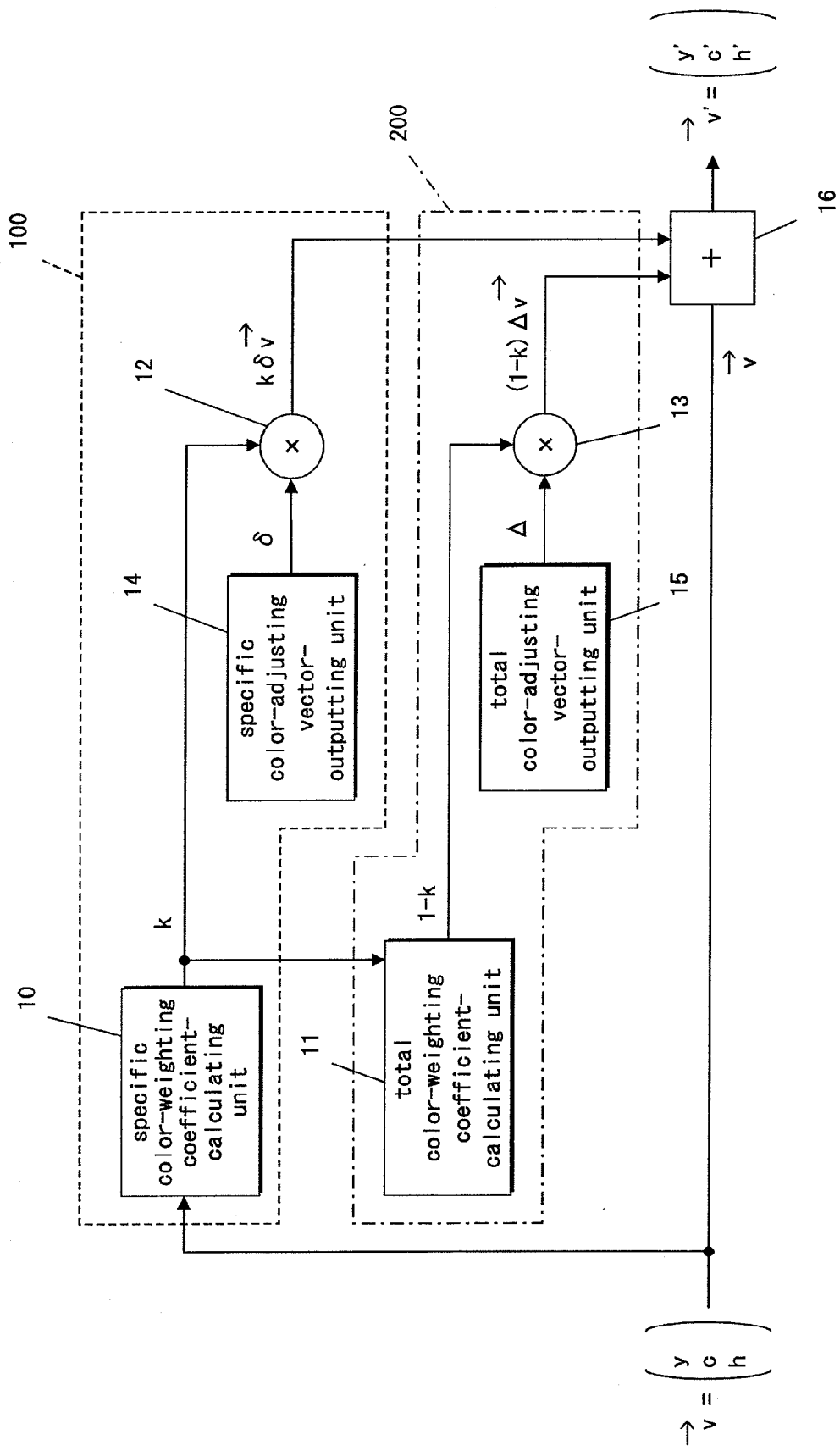
FIG. 1 is a block diagram, illustrating a color-adjusting apparatus according to an embodiment 1 of the present invention.

Referring to the drawings, embodiments of the present invention will now be explained. In the following embodiments, vectors, such as a color, adjusting vectors, result vectors, and so on, are expressed using data.

(Embodiment 1)

FIG. 1 is a block diagram, illustrating a color-adjusting apparatus according to an embodiment 1 of the present invention.

The color-adjusting apparatus of the embodiment 1 adjusts an inputted color of an inputted image, with respect to one specific color and a total color, in parallel. As shown in FIG. 1, the color-adjusting apparatus comprises the following elements.

A specific color-adjusting stage 100 adjusts an inputted color with respect to a specific color. A total color-adjusting stage 200, which is provided in parallel to the specific color-adjusting stage 100, adjusts the inputted color with respect to the total color. A composing unit 16 linearly composes a vector outputted by the specific color-adjusting stage 100 and a vector outputted by the total color-adjusting stage 200.

The specific color-adjusting stage 100 comprises the following elements. A specific color-weighting coefficient-calculating unit 10 calculates a specific color-weighting coefficient k, which indicates an approximation degree of the inputted color and the specific color.

A specific color-adjusting vector-outputting unit 14 outputs a specific color-adjusting vector δ to a specific color-multiplying unit 12. The specific color-multiplying unit 12 multiplies the specific color-adjusting vector δ by a scalar of the specific color-weighting coefficient k to output a result vector k*δ of a specific color adjustment to the composing unit 16.

The total color-adjusting stage 200 comprises the following elements. A total color-weighting coefficient-calculating unit 11 calculates a total color-weighting coefficient (1−k). When the specific color-weighting coefficient k increases, then the total color-weighting coefficient (1−k) decreases, and vice versa.

A total color-adjusting vector-outputting unit 15 outputs a total color-adjusting vector Δ to a total color-multiplying unit 13. The total color-multiplying unit 13 multiplies the total color-adjusting vector Δ by a scalar of the total color-weighting coefficient (1−k) to output a result vector (1−k)*Δ of a total color adjustment to the composing unit 16.

The composing unit 16 inputs the result vector (1−k)*Δ of the total color adjustment from the total color-adjusting stage 200, and inputs the result vector k*δ of the specific color adjustment from the specific color-adjusting stage 100.

The composing unit 16 adds the result vectors (1−k)*Δ and k*δ, and outputs an added vector ((1−k)*Δ+k*δ). Herein, when k=1, the added vector equals δ, and only the result of the specific color adjustment remains and the result of the total color adjustment is cancelled substantially. On the contrary, when k=0, the added vector equals Δ, and only the result of the total color adjustment remains and the result of the specific color adjustment is cancelled substantially. Note that, when k=1 or 0, the total color adjustment and the specific color adjustment are not duplicated.

In the embodiment 1, the inputted color is expressed using polar coordinates (y, c, h), which are converted from YCbCr data, each of which contains a brightness component Y and two chroma components Cb and Cr.

The specific color-weighting coefficient-calculating unit 10 inputs the inputted color, and calculates a weighting coefficient k using a function that defines an approximation degree of the inputted color and the specific color.

Figure 2A:
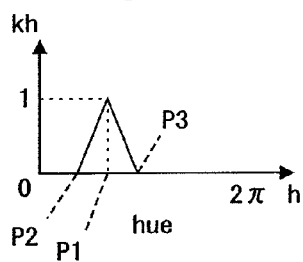
FIG. 2 (a) is a graph, explaining a weighting coefficient kh (hue) in the embodiment 1 of the present invention.
Figure 2B:
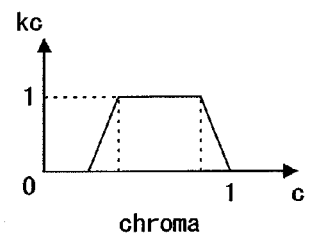
Figure 2C:
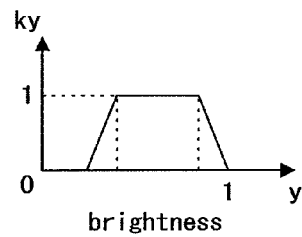

FIG. 2 (*a*) explains an example of a function of a weighting coefficient kh with respect to hue. Similarly, FIG. 2 (*b*) explains an example a function of a weighting coefficient kc with respect to chroma, and FIG. 2 (*c*) explains an example a function of a weighting coefficient ky with respect to brightness.

In this embodiment, the weighting coefficient kh with respect to hue is an important factor, when the color-adjusting apparatus according to this embodiment adjusts the inputted color. In this embodiment, the specific color is skin color, which is a "memory color".

As shown in FIG. 2 (*a*), in a hue h axis, when the hue h=P1, the hue h indicates center hue of skin color, and the weighting coefficient kh equals a maximum value of "1". When the hue h=P2 or P3, which defines boundaries deviated from the center hue P1 of skin color, the weighting coefficient kh equals a minimum value of "0".

In general, the specific color-weighting coefficient-calculating unit 10 determines that the weighting coefficient kh is the maximum value of "1", when hue of the inputted color (y, c, h) is correspondent to that of the specific color (yx, cx, hx). The weighting coefficient kh determined by the specific color-weighting coefficient-calculating unit 10, decreases gradually, when the hue h of the inputted color (y, c, h) moves from the center hue P1 of the specific color (yx, cx, hx), which is skin color in the embodiment 1, to one of the boundaries P2 and P3 along the hue h axis.

Almost similar to the weighting coefficient kh, as shown in FIG. 2 (*b*) and FIG. 2 (*c*), the specific color-weighting coefficient-calculating unit 10 determines the weighting coefficient kc with respect to chroma and the weighting coefficient ky with respect to brightness.

After determination of the weighting coefficients kh, kc and ky, the specific color-weighting coefficient-calculating unit 10 determines the specific color-weighting coefficient k using the following formula 1, and outputs the weighting coefficient k to the specific color-multiplying unit 12 and the total color-weighting coefficient-calculating unit 11.

$$k=k_y \times k_c \times k_h \qquad \text{(Formula 1)}$$

Thus, the specific color-weighting coefficient k is determined based on the weighting coefficient ky evaluated on a brightness y axis, the weighting coefficient kc evaluated on a chroma c axis, and the weighting coefficient kh evaluated on the hue h axis.

The determination of the specific color-weighting coefficient k does not have to use a function expressed by a formula, for example the formula 1. It is sufficient practically that the specific color-weighting coefficient k decreases when a distance between the inputted color and the specific color increases in a color space to which the inputted color and the specific color belong.

The total color-weighting coefficient-calculating unit 11 inputs the specific color-weighting coefficient k from the specific color-weighting coefficient-calculating unit 10, and outputs the total color-weighting coefficient (1−k), which is a weighting coefficient used for adjustment of the total color (except the specific color), to the total color-multiplying unit 13.

Furthermore, while the above-mentioned conditions are fulfilled, when the degree that the specific color-adjusting stage 100 adjusts the inputted color increases, then the degree that the total color-adjusting stage 200 adjusts the inputted color decreases, and vice versa.

The specific color-adjusting vector-outputting unit 14 outputs an adjusting vector δ (δy, δc, δh) that adjusts the inputted color with respect to the specific color, to the specific color-multiplying unit 12. The total color-adjusting vector-outputting unit 15 outputs an adjusting vector Δ (Δy, Δc, Δh) that adjusts the inputted color with respect to the total color (except the specific color) to the total color-multiplying unit 13.

When the inputted color is (y, c, h), an outputted color (y', c', h') generated is determined using the following three formulas 2, 3 and 4.

$$y'=y+k \times \delta_y+(1-k) \times \Delta_y \qquad \text{(Formula 2)}$$

$$c'=c+k \times \delta_c+(1-k) \times \Delta_c \qquad \text{(Formula 3)}$$

$$h'=h+k \times \delta_h+(1-k) \times \Delta_h \qquad \text{(Formula 4)}$$

The specific color-weighting coefficient k, the total color-weighting coefficient (1−k), the specific color-adjusting vector δ, and the total color-adjusting vector A may be determined by calculations, using the formulas 1 to 4. However, preferably, these coefficients and vectors are determined by referring to a look-up table that stores results of the calculations to perform more rapid operation.

According to the embodiment 1, the following effects can be obtained.

(Effect 1) When the color-adjusting apparatus according to conventional techniques should adjust both of the specific color and the total color, the color-adjusting apparatus performs a specific color adjustment after a total color adjustment. Concerning the specific color, duplicated adjustments must be made. Therefore, quality of image may be deteriorated very easily, caused by the quantization error and/or the clip of a value, and so on.

On the contrary, according to the embodiment 1, with respect to the specific color, the total color adjustment and the specific color adjustment are not duplicated. Therefore, the color-adjusting apparatus according to the embodiment 1 can retain fine quality of image, suppressing possible occurrence of the quantization error and/or the clip of a value, and so on.

(Effect 2) Since the total color-adjusting vector and the specific color-adjusting vector changes gradually and cooperatively (see FIG. 2 (a) etc.), also in the neighborhood of a boundary whose color is the specific color, pseudo contours hardly appear.

(Effect 3) Not a result vector of direct conversion of the inputted color, but the sum of the inputted color, the total color-adjusting vector, and the specific color-adjusting vector, is outputted as the adjusted color. Therefore, the adjusted color does not lose gradation of the inputted color caused by quantization errors, and so on.

(Effect 4) When a color-adjusting apparatus according to conventional techniques should not change brightness and/or chroma with respect to the specific color and should change hue of the specific color to preferred one, the color-adjusting apparatus performs a specific color adjustment after a total color adjustment. The adjustments become non-linear conversion as a whole.

In the same case, conversion of the color-adjusting apparatus according to the embodiment 1 is linear as a whole. A user thereof can think that the specific color-adjusting vector and the total color-adjusting vector are independent to each other, and can set the vectors. Therefore, the user can adjust the inputted color with respect to the specific color easily.

The embodiment 1 may be changed as follows: In the embodiment 1, the inputted color uses the YCbCr color space. However, the color space may be another one, such as an RGB color space, a CMYK color space, a CIE-LAB color space, and an HSV color space. When the CIE-LAB color space is used, since a distance in the CIE-LAB color space is proportional to a degree of difference that a human feels between a color and another color, it is easy to determine the specific color-weighting coefficient k.

When a used color space is a color space (for example, the YCbCr color space and the HSV color space) that is defined using three attributes (for example, brightness, chroma and hue), the user can determine the color-adjusting vectors easily, because the user can understand the color-adjusting vectors, intuitively.

(Embodiment 2)

Referring to FIG. 3 to FIG. 8, an embodiment 2 of the present invention will now be explained. In order to avoid duplicated explanation, hereinafter, explanation of the same points as the embodiment 1 is omitted.

In the embodiment 2, differing from the embodiment 1, the inputted color is adjusted with respect to a plurality of specific colors utilizing adjusting vectors that are determined based on the inputted color, and a color space of the inputted color is mapped into an adjustment color space.

More particularly, in the embodiment 2, the plurality of specific colors are three "memory colors" (skin color, grass green, and sky blue).

Figure 3:
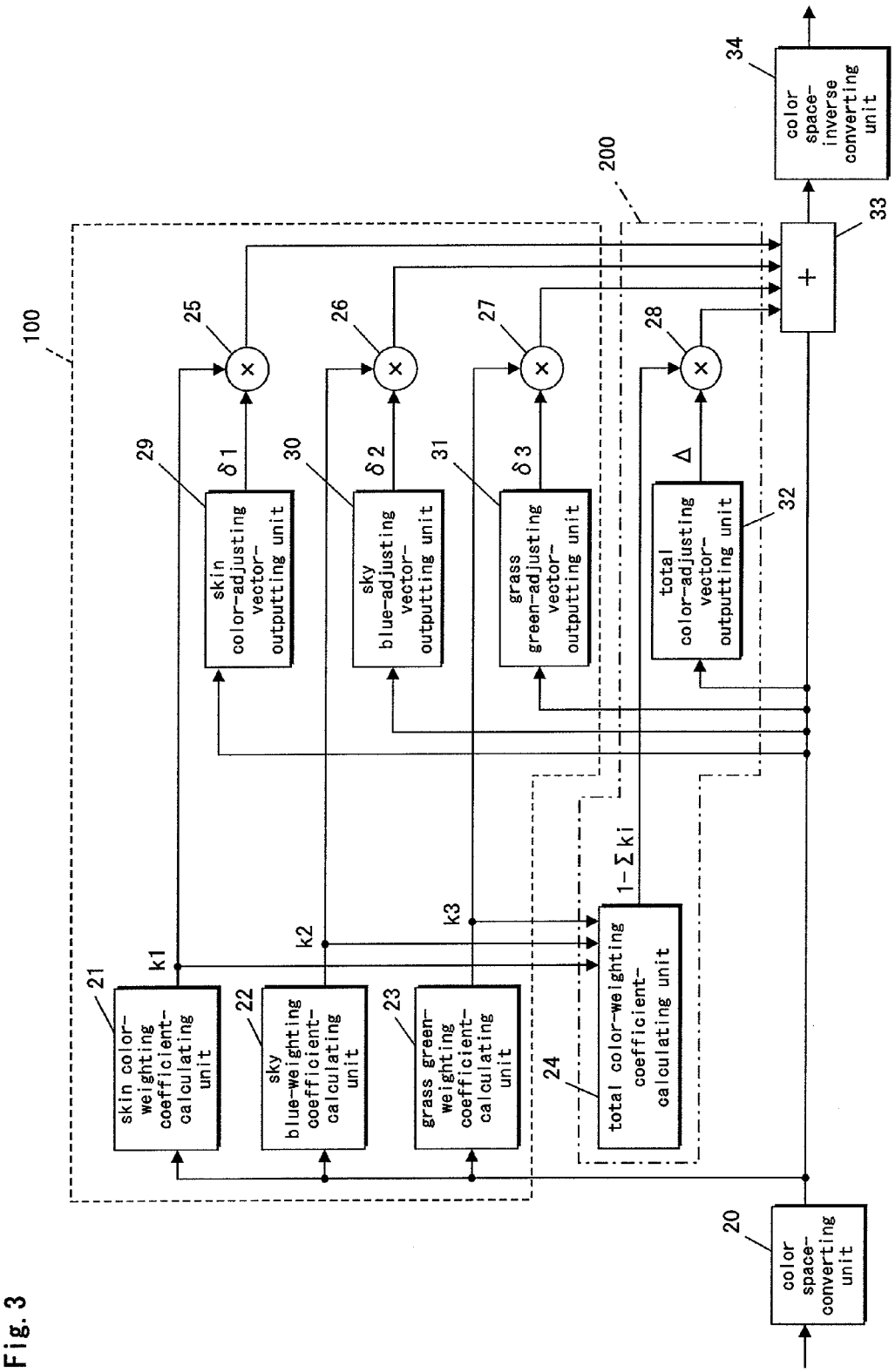
FIG. 3 is a block diagram, illustrating a color-adjusting apparatus according to an embodiment 2 of the present invention.

As shown in FIG. 3, a specific color-adjusting stage 100 comprises the following elements.

A skin color-weighting coefficient-calculating unit 21 calculates a specific color-weighting coefficient k1 that indicates an approximation degree of the inputted color and skin color. A skin color-adjusting vector-outputting unit 29 outputs a specific color-adjusting vector δ1 with respect to skin color. The specific color-multiplying unit 25 multiplies the specific color-adjusting vector δ1 by a scalar of the specific color-weighting coefficient k1 to output a result vector k1*δ1 of a skin color adjustment to the composing unit 33.

A sky blue-weighting coefficient-calculating unit 22 calculates a specific color-weighting coefficient k2 that indicates an approximation degree of the inputted color and sky blue. A sky blue-adjusting vector-outputting unit 30 outputs a specific color-adjusting vector δ2 with respect to sky blue. The specific color-multiplying unit 26 multiplies the specific color-adjusting vector δ2 by a scalar of the specific color-weighting coefficient k2 to output a result vector k2*δ2 of a sky blue adjustment to the composing unit 33.

A grass green-weighting coefficient-calculating unit 23 calculates a specific color-weighting coefficient k3 that indicates an approximation degree of the inputted color and grass green. A grass green-adjusting vector-outputting unit 31 outputs a specific color-adjusting vector δ3 with respect to grass green. The specific color-multiplying unit 27 multiplies the specific color-adjusting vector δ3 by a scalar of the specific color-weighting coefficient k3 to output a result vector k3*δ3 of a grass green adjustment to the composing unit 33.

In the embodiment 1, one specific color-weighting coefficient k is used. However, in the embodiment 2, the plurality of specific color-weighting coefficients ki (=k1, k2, . . . , kn) are used, where n is a natural number indicating how many specific colors are handled. In this embodiment, n=3.

In general, when the inputted color equals a specific color corresponding to one of the plurality of specific color-weighting coefficients ki, whose value is "1", that is, a maximum value thereof. When a distance between the inputted color and a specific color increases, the total color-weighting coefficients ki corresponding to the specific color decreases from the maximum value.

A total color-adjusting stage 200 comprises the following elements.

A total color-weighting coefficient-calculating unit 24 calculates a total color-weighting coefficient (1−Σki, where Σki means summation of ki with i=1 to n; n=3 in the present embodiment). In this embodiment, the plurality of specific color-weighting coefficients ki are used, the total color-weighting coefficient is the value of "1" minus the sum Σki.

Similarly to the case where one specific color-weighting coefficient k is used, when the sum Σki equals a value of "1", the total color adjustment is cancelled substantially. When the sum Σki equals zero, the specific color adjustment is cancelled substantially. Note that, when the sum Σki=1 or 0, the total color adjustment and the specific color adjustments are not duplicated.

A total color-adjusting vector-outputting unit 32 outputs a total color-adjusting vector Δ to a total color-multiplying unit 28.

A total color-multiplying unit 28 multiplies the total color-adjusting vector Δ by a scalar of the total color-weighting coefficient (1−Σki) to output a result vector (1−Σki)*Δ of a total color adjustment to the composing unit 33.

A color space-converting unit 20 is provided prior to both of the specific color-adjusting stage 100 and the total color-adjusting stage 200. A color space-inverse converting unit 34 is provided next to the composing unit 33.

The color space-converting unit 20 maps the inputted color in an RGB color space, which is an original color space thereof, into the inputted color in an HSV color space, whose coordinates relate to brightness, chroma, and hue, respectively.

The composing unit 33 outputs an adjusted color in the HSV color space to the space-inverse converting unit 34. The space-inverse converting unit 34 maps the adjusted color in the HSV color into the adjusted color in the RGB color space.

The skin color-weighting coefficient-calculating unit 21, whose specific color is skin color, outputs the specific color-weighting coefficient k1 according to FIG. 4 (*a*), FIG. 4 (*b*) and FIG. 4 (*c*).

Similarly, the sky blue-weighting coefficient-calculating unit 22, whose specific color is sky blue, outputs the specific color-weighting coefficient k2 according to FIG. 4 (*d*), FIG. 4 (*e*) and FIG. 4 (*f*). The grass green specific color-weighting coefficient-calculating unit 23, whose specific color is grass green, outputs the specific color-weighting coefficient k3 according to FIG. 4 (*g*), FIG. 4 (*h*) and FIG. 4 (*i*).

A set of FIG. 4 (*a*) to FIG. 4 (*c*) has the same characteristic as that of a set of FIG. 2 (*a*) to FIG. 2 (*c*), because the two sets relate to skin color, mutually. Each of a set of FIG. 4 (*d*) to FIG. 4 (*f*) and a set of FIG. 4 (*g*) to FIG. 4 (*i*), has a characteristic different from that of the set of FIG. 2 (*a*) to FIG. 2 (*c*), according to the specific color related thereto.

In each of the set of FIG. 4 (*a*) to FIG. 4 (*c*), the set of FIG. 4 (*d*) to FIG. 4 (*f*), and the set of FIG. 4 (*g*) to FIG. 4 (*i*), the center hue P1 and the boundaries P2 and P3 thereof have a positional relationship similar to that of the set of FIG. 2 (*a*) to FIG. 2 (*c*).

Herein, it is assumed that a corresponding axis is one of a hue axis, a chroma axis and a brightness axis. In each of the set of FIG. 4 (*a*) to FIG. 4 (*c*), the set of FIG. 4 (*d*) to FIG. 4 (*f*), and the set of FIG. 4 (*g*) to FIG. 4 (*i*), when a color (h, s, v) equals the specific color (hx, sx, vx) in the corresponding axis, the weighting coefficient of the corresponding axis is a maximum value of "1". When a distance between the color (h, s, v) and the specific color (hx, sx, vx) increases, the weighting coefficients of the corresponding axis tends to decrease to a minimum value of "0" at least.

The total color-weighting coefficient-calculating unit 24 inputs the specific color-weighting coefficients k1, k2 and k3, and outputs a weighting coefficient kAll expressed by the following formula 5.

$$k_{ALL} = \sum_{i=1}^{3} k_i \qquad \text{(Formula 5)}$$

The skin color-adjusting vector-outputting unit 29 inputs the inputted color (h, s, v), which has been mapped into the HSV color space by the color space-converting unit 20, and determines the adjusting vector δ1=(δH1, δS1, δV1), as shown in FIG. 5 (*a*), FIG. 5 (*b*), and FIG. 5 (*c*).

In this example, the inputted color (h, s, v) is adjusted such that a chroma coordinate of the inputted color does not change, such that a hue coordinate of the inputted color approaches to a target hue coordinate (the center hue P1 of skin color), and such that a brightness coordinate of the inputted color approaches to a target brightness coordinate, whose brightness is the most preferable as that of skin color.

The sky blue-adjusting vector-outputting unit 30 inputs the inputted color (h, s, v), which has been mapped into the HSV color space by the color space-converting unit 20, and determines the adjusting vector δ2=(δH2, δS2, δV2), as shown in FIG. 5 (*d*), FIG. 5 (*e*), and FIG. 5 (*f*). The grass green-adjusting vector-outputting unit 31 inputs the inputted color (h, s, v), which has been mapped into the HSV color space by the color space-converting unit 20, and determines the adjusting vector δ3=(δH3, δS3, δV3), as shown in FIG. 5 (*g*), FIG. 5 (*h*), and FIG. 5 (*i*).

FIG. 6 explains an example of a total color-adjusting vector outputted from the total color-adjusting vector-outputting unit 32. In this example, the total color-adjusting vector adjusts the inputted vector (h, s, v) such that the hue coordinate of the inputted vector does not change, that the chroma coordinate of the inputted vector is multiplied by a factor of "1.2", and that the brightness coordinate of the inputted vector is multiplied by a factor of "1.1".

Herein, vectors δi (i is a natural number, i=1 to 3) are specific color-adjusting vectors, and Δ is a total color-adjusting vector. An outputted color (H', S', V'), adjusted from an inputted color (H, S, V), is expressed using the following three formulas.

$$H' = H + \sum_{i=1}^{3}(k_i \times \delta_{Hi}) + (1 - k_{ALL}) \times \Delta_H \qquad \text{(Formula 6)}$$

$$S' = S + \sum_{i=1}^{3}(k_i \times \delta_{Si}) + (1 - k_{ALL}) \times \Delta_S \qquad \text{(Formula 7)}$$

$$V' = V + \sum_{i=1}^{3}(k_i \times \delta_{Vi}) + (1 - k_{ALL}) \times \Delta_V \qquad \text{(Formula 8)}$$

Figure 7:
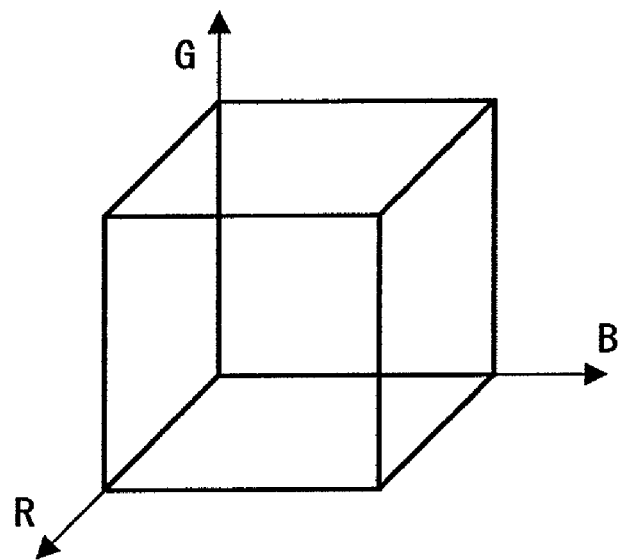
FIG. 7 is a descriptive illustration, showing an RGB color space in the embodiment 2 of the present invention.

Next, the color space-converting unit 20 and the color space-inverse converting unit 34 will now be explained. As described above, in many cases, the inputted color is expressed in the RGB color space, which is used as control signals for a display device comprising red, green and blue light-emitting elements, as shown in FIG. 7.

Figure 8:
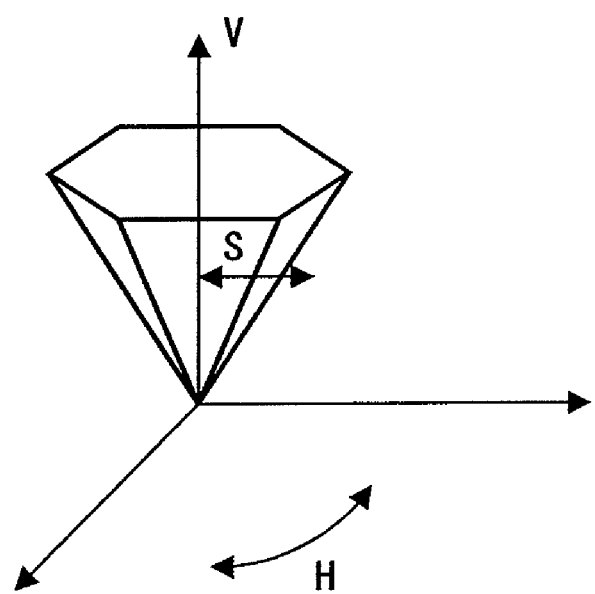
FIG. 8 is a descriptive illustration, showing an HSV color space in the embodiment 2 of the present invention.

In this embodiment, the inputted color in the RGB color space is mapped into an HSV (H: hue, S: chroma, and V: brightness) color space defined by a hexagonal pyramid model proposed by Smith. The hexagonal pyramid model is shown in FIG. 8.

Referring to "Gazou Kaiseki Handbook (image analysis handbook)", The Tokyo University Press, p. 485, the color space-converting unit 20 may map the inputted color in the RGB color space into the inputted color in the HSV color space using the following seven formulas.

$V=\max(R,G,B)$ (Formula 9)

$i=\min(R,G,B)$ (Formula 10)

$S=(V-i)/V$ (Formula 11)

$r=(V-R)/(V-i)$ (Formula 12)

$g=(V-G)/(V-i)$ (Formula 13)

$b=(V-B)/(V-i)$ (Formula 14)

When $R=V \Rightarrow H=b-g$

When $G=V \Rightarrow H=2+r-b$

When $B=V \Rightarrow H=4+g-r$ (Formula 15)

The color space-inverse converting unit 34 may map the adjusted color in the HSV color space into the adjusted color in the RGB color space using the following two formulas.

When S=0, $$R=G=B=V \quad \text{(Formula 16)}$$

When S≠0, $$h=\text{floor}(H)$$

$$P=V \cdot (1-S)$$

$$Q=V \cdot \{1-S \cdot (H-h)\}$$

$$T=V \cdot \{1-S \cdot (1-H+h)\}$$

When h=0 ⇒ R=V, G=T, B=P

When h=1 ⇒ R=Q, G=V, B=P

When h=2 ⇒ R=P, G=V, B=T

When h=3 ⇒ R=P, G=Q B=V

When h=4 ⇒ R=T, G=P, B=V

When h=5 ⇒ R=V, G=P, B=Q   (Formula 17)

Where floor (x) is a function that outputs a whole number part of the number "x".

In general, the capacity of the RGB color space equals the capacity of the HSV color space. Therefore, mapping between the RGB color space and the HSV color space, can be performed one by one, mutually.

For example, the YCbCr color space, which is neither the RGB color space nor the HSV color space, has a chroma coordinate whose domain exceeds that of the RGB color space. In the YCbCr color space, it is allowed that the chroma coordinate has a value pointing the outside of the RGB color space. Therefore, mapping an adjusted color in the YCbCr color space into the adjusted color in the RGB color space may cause a clip of the adjusted color, because of the difference of the domains.

Since each of the RGB color space and the HSV color space has the same capacity, mapping a color between the RGB color space and the HSV color space does not cause any clip of the color.

According to the embodiment 2, the following effects can be obtained.

(Effect 1) Adjustments with respect to a plurality of specific colors are available. Similarly to the embodiment 1, the total color adjustment and the specific color adjustments are not duplicated. Therefore, the color-adjusting apparatus according to the embodiment 2 can retain fine quality of image, suppressing possible occurrence of the quantization error and/or the clip of a value, and so on.

Assume a case where hue of the inputted color should be independently adjusted with respect to each of the plurality of colors, and where a total color adjustment should be made such that chroma of the inputted color is multiplied by a factor of "1.2".

In this case, according to the embodiment 2, it is sufficient to determine each of specific color-adjusting vectors such that the chroma of the inputted color is multiplied by a factor of "1.2". When this condition is fulfilled, since the total color-weighting coefficient is determined based on the specific color-weighting coefficients (see, the formula 1), the inputted color is adjusted such that the chroma of the inputted color is multiplied by a factor of "1.2", as expected. Furthermore, this adjustment can be made, even when one color of the plurality of specific colors is so close to another color that weighting coefficients of the two colors overlap with each other.

(Effect 2) Since the color space where the inputted color is adjusted is the HSV color space, a clip of the inputted color caused by mapping the inputted color in the RGB color space into the inputted color in the color space where the inputted color is adjusted. A clip of the adjusted color does not occur even in reversely mapping the adjusted color in the color space where the inputted color is adjusted into the adjusted color in the RGB color space.

That is, according to the embodiment 2, a problem of clipping, which is often encountered in the prior art when a color space of a color is mapped, has been resolved automatically. Therefore, a user of the color-adjusting apparatus according to the embodiment 2 need not give careful consideration to the problem.

The embodiment 2 may be changed as follows:

(1) In the embodiment 2, specific colors are skin color, sky blue, and grass green. However, the specific colors may be other colors, such as bright sky blue, dark sky blue, red, and yellow, and so on. Furthermore, the number of the specific colors may be changed.

(2) In the embodiment 2, the color space where the inputted color is adjusted is the HSV color space. However, the color space where the inputted color is adjusted may be another color space, such as the RGB color space, the CMYK color space, the CIE-LAB color space, and the YCbCr color space.

(3) In the embodiment 2, the color space of the inputted color is the RGB color space. However, the color space of the inputted color may be another color space, such as the YCbCr color space. It is sufficient that the color space-converting unit can map the inputted color in a color space into the inputted color in a color space for color adjustment. Furthermore, the color space, into which the color space-converting unit maps, is not limited to the HSV color space.

(4) In the embodiment 2, a color space of the outputted color is the RGB color space. However, the color space of the outputted color may be another color space, such as the CMY color space and does not have to equal the color space of the inputted color.

(5) In the embodiment 2, the hexagonal pyramid model is used. However, another approximation model, such as a bi-hexagonal pyramid model, and so on, may be used.

(Embodiment 3)

Figure 9:
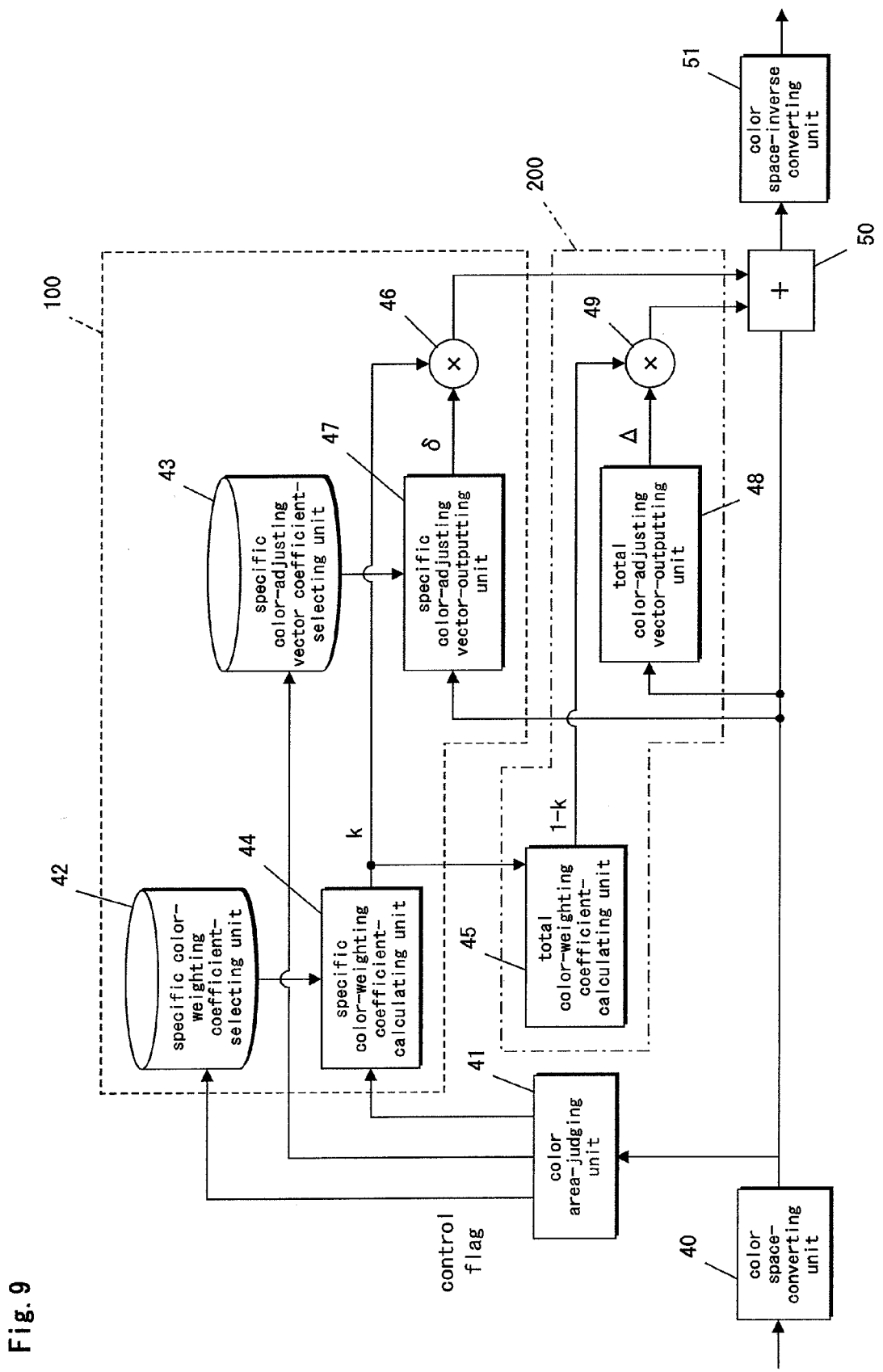
FIG. 9 is a block diagram, illustrating a color-adjusting apparatus according to an embodiment 3 of the present invention.
Figure 10A:
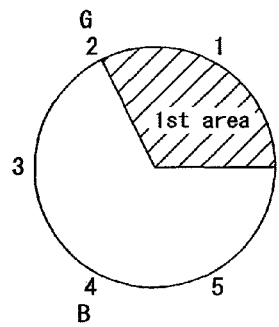
FIG. 10 (a) is a descriptive illustration, showing a first area in the embodiment 3 of the present invention.
Figure 10B:
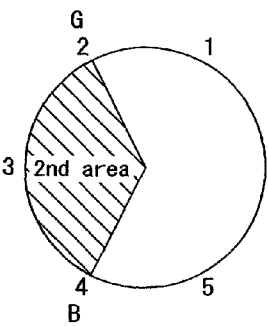
Figure 10C:
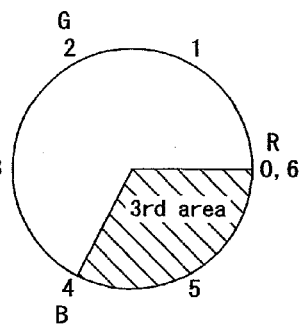

Referring to FIG. 9 to FIG. 10, an embodiment 3 of the present invention will now be explained. In order to avoid duplicated explanation, hereinafter, explanation of the same points as the embodiment 1 is omitted.

As shown in FIG. 9, a composing unit 50 composes linearly a vector outputted from the specific color-adjusting stage 100 and a vector outputted from the total color-adjusting stage 200. A color space-converting unit 40 and a color space-inverse converting unit 51 are the same as those having the same names in FIG. 3, respectively.

A color area-judging unit 41 stores individual area information for a color space divided into a plurality of areas, determines an area to which the inputted color belongs. The color area-judging unit 41 further outputs the area information corresponding to the inputted color to the following three units; a specific color-weighting coefficient-selecting unit 42, a specific color-adjusting vector coefficient-selecting unit 43, and a specific color-weighting coefficient-calculating unit 44.

The specific color-weighting coefficient-selecting unit 42 stores a plurality of specific color-weighting coefficients. When the specific color-weighting coefficient-selecting unit 42 inputs the area information corresponding to the inputted color from the color area-judging unit 41, the specific color-weighting coefficient-selecting unit 42 selects a specific color-weighting coefficient corresponding to the area information, from the plurality of specific color-weighting coefficients stored therein, and outputs the selected specific color-weighting coefficient to the specific color-weighting coefficient-calculating unit 44.

The specific color-weighting coefficient-calculating unit 44 calculates a specific color-weighting coefficient k, which indicates an approximation degree of the inputted color and the specific color. The specific color-weighting coefficient k is inputted from the specific color-weighting coefficient-selecting unit 42, and corresponds to the area information determined by the color area-judging unit 41. Furthermore, the specific color-weighting coefficient-calculating unit 44 outputs the specific color-weighting coefficient k to a total color-weighting coefficient-calculating unit 45 and a multiplying unit 46.

The specific color-weighting coefficient-calculating unit 44 uses the area information as an offset of a current domain. The current domain defines one of the plurality of areas into which the color area-judging unit 41 divides the color space of the inputted color.

The specific color-adjusting vector coefficient-selecting unit 43 stores a plurality of specific color-adjusting vector coefficients for determining specific color-adjusting vectors. The specific color-adjusting vector coefficient-selecting unit 43 inputs the area information from the color area-judging unit 41, and outputs a specific color-adjusting vector coefficient corresponding to the area information, from the plurality of specific color-adjusting vector coefficients stored therein, to the specific color-adjusting vector-outputting unit 47.

The specific color-adjusting vector-outputting unit 47 inputs the specific color-adjusting vector coefficient from the specific color-adjusting vector coefficient-selecting unit 43, and determines a specific color-adjusting vector δ corresponding to the area information. Then, the specific color-adjusting vector-outputting unit 47 outputs the specific color-adjusting vector δ corresponding to the area information, to the multiplying unit 46.

In the embodiment 3, similarly to the embodiment 2, adjustments with respect to a plurality of specific colors and an adjustment with respect to the total color are made in parallel.

However, as shown in FIG. 10 (*a*) to FIG. 10 (*c*), in the embodiment 3, dissimilarly to the embodiment 2, the color space of the inputted color is divided into a plurality of areas (a first area, a second area, and a third area in the present embodiment) such that each of the plurality of specific colors belongs to each of the plurality of areas, avoiding overlapping each other.

Differing from the embodiment 2, in the embodiment 3, the color area-judging unit 41 judges, among the plurality of areas, an area to which the inputted color belongs. Then, based on the judgment result thereof, the specific color-weighting coefficient-selecting unit 42 and the specific color-adjusting vector coefficient-selecting unit 43 select corresponding coefficients, respectively.

Thereby, differing from the embodiment 2, in the embodiment 3, pairs of weighting coefficient-calculating units and adjusting vector-outputting units need not be provided as many as the number of the specific colors to perform substantially the same processes as those of the embodiment 2.

Referring to FIG. 10, an example of dividing the areas will now be explained.

FIG. 10 (*a*) to FIG. 10 (*c*) show views in a direction perpendicular to the brightness V axis. Each of portions with slant lines shows an inside of a selected area. In FIG. 10 (*a*) to FIG. 10 (*c*), a direction of a rotation angle shows hue H, and a radial shows chroma S. When the hue H has a value of "0" or a value of "6", the color thereof is red. When the hue H has a value of "2", the color thereof is green. When the hue H has a value of "4", the color thereof is blue.

In this embodiment, the color space of the inputted color is divided into the plurality of areas according to the hue H. The color area-judging unit 41 determines which area hue of the inputted color belongs to, among the first area of FIG. 10 (*a*), the second area of FIG. 10 (*b*), and the third area of FIG. 10 (*c*). The color area-judging unit 41 outputs a control flag to the specific color-weighting coefficient-selecting unit 42 and the specific color-adjusting vector coefficient-selecting unit 43. In the embodiment 3, the control flag is area information that corresponds to the area determined by the color area-judging unit 41, and an example of the control flag is shown in the following table 1.

TABLE 1

| condition | control flag |
|---|---|
| 0 ≦ input hue < 2 | 0 |
| 2 ≦ input hue < 4 | 1 |
| 4 ≦ input hue < 6 | 2 |

The specific color-weighting coefficient-selecting unit 42 selects a weighting coefficient corresponding to the control flag, and outputs a selected weighting coefficient to the specific color-weighting coefficient-calculating unit 44.

The specific color-adjusting vector coefficient-selecting unit 43 selects an adjusting vector coefficient corresponding to the control flag, and outputs a selected adjusting vector coefficient to the specific color-adjusting vector-outputting unit 47.

The color area-judging unit 41 outputs a number that is the hue of the inputted color minus the offset, to the specific color-weighting coefficient-calculating unit 44.

When the hue of the inputted color belongs to the first area, the offset is a value of "0", and hue outputted from the color area-judging unit 41 equals the hue of the inputted color.

When the hue of the inputted color belongs to the second area, the offset is a value of "2". When the hue of the inputted color belongs to the third area, the offset is a value of "4".

When the offset is not a value of "0", the hue of the inputted color is decreased by the offset, a domain of the hue h is reduced to that of 0<=h<2. Thereby, a circuit scale necessary for handling information of the domain can be reduced.

According to the embodiment 3, the following effect can be obtained.

(Effect 1) In the embodiment 2, pairs of weighting coefficient-calculating units and adjusting vector-outputting units should be provided as many as the number of the specific colors. However, in the embodiment 3, it is sufficient that one pair of weighting coefficient-calculating unit and adjusting vector-outputting unit are provided. Thereby, the necessary circuit scale according to the embodiment 3 can be reduced by comparison with that of the embodiment 2.

The embodiment 3 can be changed as follows:

(1) In the embodiment 3, the color area-judging unit 41 judges the color area according to the hue of the inputted color. However, another judgment, such as judgment according to the brightness and/or the chroma of the inputted color, judgment according to any value in another color space (e.g. the RGB color space), and so on, may be performed.

(2) In the embodiment 3, the color area-judging unit 41 outputs a number that is the hue of the inputted color minus the offset to the specific color-weighting coefficient-calculating unit 44. However, the color area-judging unit 41 may output the hue of the inputted color to the specific color-weighting coefficient-calculating unit 44, directly.

(Embodiment 4)

Figure 11:
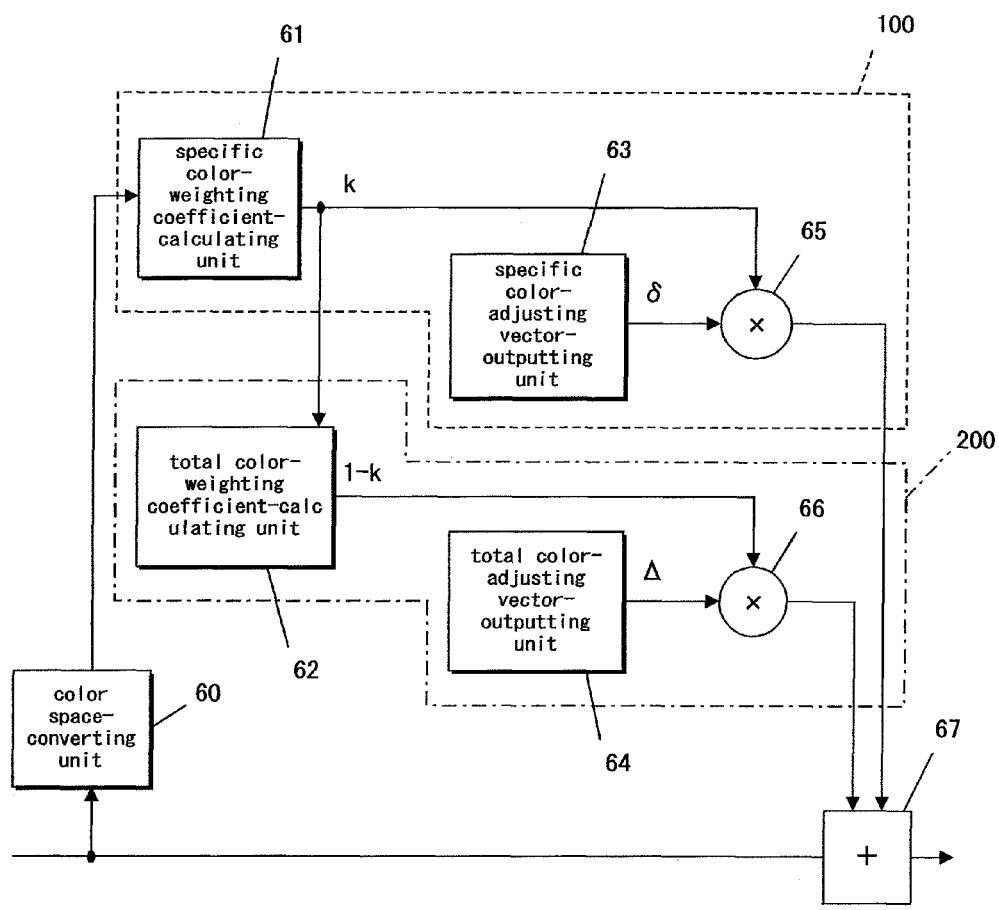
FIG. 11 is a block diagram, illustrating a color-adjusting apparatus according to an embodiment 4 of the present invention.
Figure 12:
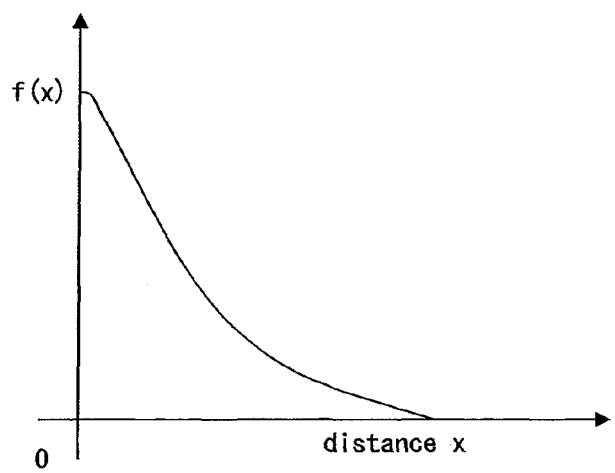
FIG. 12 is a graph, showing a function for calculating a specific color-weighting coefficient in the embodiment 4 of the present invention.
Figure 13:
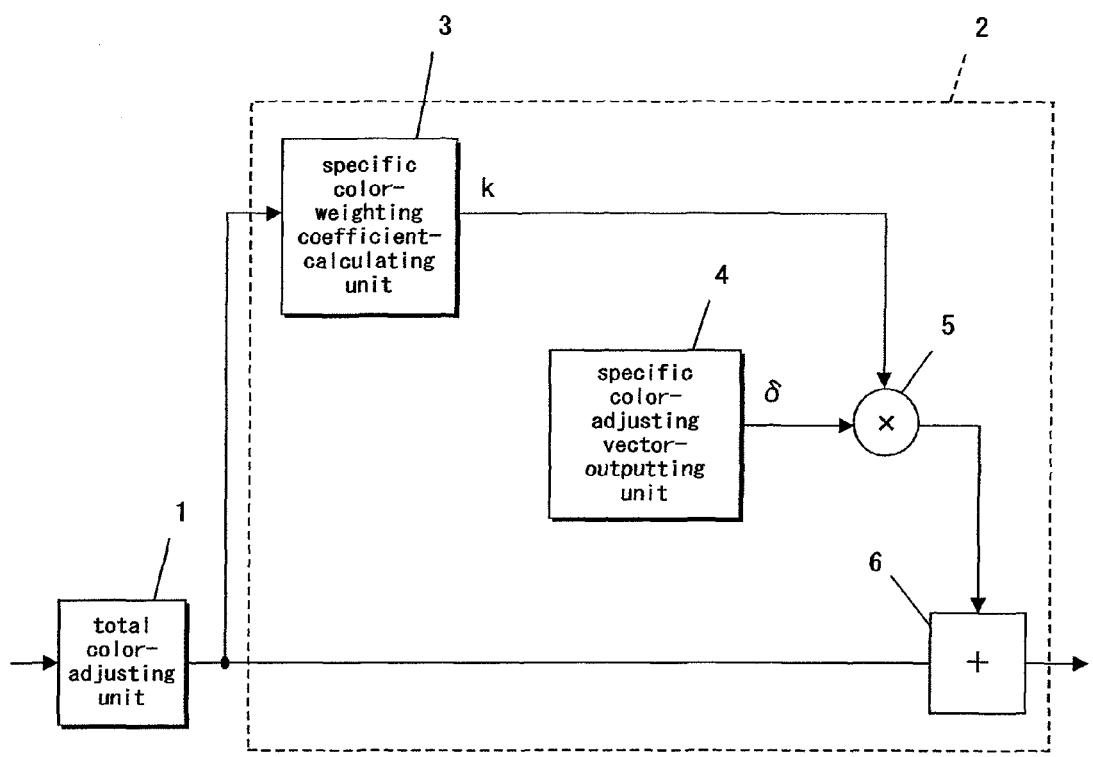
FIG. 13 is a block diagram, illustrating a conventional color-adjusting apparatus.

Referring to FIG. 11 to FIG. 12, an embodiment 4 will now be explained. In order to avoid duplicated explanation, hereinafter, explanation of the same points as the embodiment 1 is omitted.

FIG. 11 is a block diagram, illustrating a color-adjusting apparatus according to the embodiment 4 of the present invention.

Differing from the embodiment 3, in the embodiment 4, a color space-converting unit 60 outputs a result thereof to a specific color-weighting coefficient-calculating unit 61, restrictedly. Further, a color space where calculation of a specific color-weighting coefficient is performed, is different from a color space where calculation of a specific color-weighting coefficient is performed.

The operation of the color-adjusting apparatus according to the embodiment 4 will now be explained.

The color space-converting unit 60 maps the RGB color space of the inputted color into the CIE-LAB color space, using the following four formulas.

$$\begin{pmatrix} X \\ Y \\ Z \end{pmatrix} = (M) \begin{pmatrix} R^{1/r} \\ G^{1/r} \\ B^{1/r} \end{pmatrix} \quad \text{(Formula 18)}$$

$$L^* = 116\left(\frac{Y}{Y_0}\right)^{\frac{1}{3}} - 16, \quad \text{(Formula 19)}$$

$$\left(\frac{Y}{Y_0} > 0.008856\right)$$

$$a^* = 500\left[\left(\frac{X}{X_0}\right)^{\frac{1}{3}} - \left(\frac{Y}{Y_0}\right)^{\frac{1}{3}}\right] \quad \text{(Formula 20)}$$

$$b^* = 200\left[\left(\frac{Y}{Y_0}\right)^{\frac{1}{3}} - \left(\frac{Z}{Z_0}\right)^{\frac{1}{3}}\right] \quad \text{(Formula 21)}$$

Herein, assuming that a specific color is (Lx*, ax*, bx*), a specific color-weighting coefficient k thereof is expressed using the following two formulas.

$$x = \sqrt{(L^*_x - L^*)^2 + (a^*_x - a^*)^2 + (b^*_x - b^*)^2} \quad \text{(Formula 22)}$$

$$k = f(x) \quad \text{(Formula 23)}$$

Herein, FIG. 12 shows an example of the function f(x). The specific color-weighting coefficient-calculating unit 61 operates in the same manner as that of the specific color-weighting coefficient-calculating unit 10 of the embodiment 1.

When the specific color-adjusting vector-outputting unit 63 outputs ($\delta R$, $\delta G$, $\delta B$), and the total color-adjusting vector-outputting unit 64 outputs ($\Delta R$, $\Delta G$, $\Delta B$), an outputted color (R', G', B') adjusted from the inputted color (R, G, B) is expressed using the following three formulas.

$$R' = R + k \times \delta_R + (1-k) \times \Delta_R \quad \text{(Formula 24)}$$

$$G' = G + k \times \delta_G + (1-k) \times \Delta_G \quad \text{(Formula 25)}$$

$$B' = B + k \times \delta_B + (1-k) \times \Delta_B \quad \text{(Formula 26)}$$

According to this embodiment, the following effect can be obtained.

(Effect 1) The CIE-LAB color space is used when the specific color-weighting coefficient is determined, and a distance in the CIE-LAB color space is proportional to a degree of difference that a human feels. Therefore, a user of the color-adjusting apparatus according to the embodiment 4 can set the specific color-weighting coefficient, intuitively and easily.

Furthermore, since the inputted color is adjusted in the color space of the inputted color itself, the following potential problems can be avoided; the quantization error, the clipping of a value, and so on, which may be caused by color space conversion and color space inverse conversion. Thereby, the color-adjusting apparatus according to the embodiment 4 can retain fine quality of image.

The embodiment 4 can be changed as follows:

(1) In the embodiment 4, one specific color is handled. However, a plurality of specific colors, similar to the embodiments 2 and 3, may be handled.

(2) In the embodiment 4, the specific color-weighting coefficient is determined in the CIE-LAB color space, and the adjusting vectors are determined in the RGB color space. However, it is sufficient that a color space where calculation of a specific color-weighting coefficient is performed is different from a color space where calculation of a specific color-weighting coefficient is performed.

According to the present invention, since the total color adjustment and the specific color adjustment are not duplicated but are made in parallel, the color-adjusting apparatus according to the present invention can retain quality of an inputted image fine, suppressing possible occurrence of the quantization error and/or the clip of a value, and so on.

Furthermore, since the adjustments as a whole retain linearity, a user can handle easily the color-adjusting apparatus according to the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A processor used for an image outputting device, the processor being operable to execute a set of instructions stored by a storage device, the set of instructions comprising:

an instruction for determining a first ratio for adjusting an inputted image signal with respect to a specific color including at least one of skin color, sky blue, and grass green;

an instruction for adjusting the inputted image signal with respect to the specific color according to the determined first ratio to output a first result;

an instruction for adjusting the inputted image signal with respect to a total color according to a second ratio to output a second result, wherein when the first ratio increases then the second ratio decreases, wherein when the first ratio decreases then the second ratio increases, and wherein the adjusting the inputted image signal with respect to the specific color and the adjusting the inputted image signal with respect to the total color are performed in parallel;

an instruction for composing the first result and the second result, thereby outputting a composed image signal; and an instruction for adding the inputted image signal to the composed image signal.

2. An image display device including a processor being operable to execute a set of instructions stored by a storage device, the set of instructions comprising: an instruction for determining a first ratio for adjusting an inputted image signal with respect to a specific color including at least one of skin color, sky blue and grass green;
 an instruction for adjusting the inputted image signal with respect to the specific color according to the determined first ratio to output a first result;
 an instruction for adjusting the inputted image signal with respect to a total color according to a second ratio to output a second result, wherein when the first ratio increases then the second ratio decreases, wherein when the first ratio decreases then the second ratio increases, and wherein the adjusting the inputted image signal with respect to the specific color and the adjusting the inputted image signal with respect to the total color are performed in parallel;
 an instruction for composing the first result and the second result, thereby outputting a composed image signal; and
 an instruction for adding the inputted image signal to the composed image signal.

* * * * *